US012332963B2

(12) United States Patent
Bar Hakim et al.

(10) Patent No.: US 12,332,963 B2
(45) Date of Patent: Jun. 17, 2025

(54) DYNAMIC RECORDER FOR DEMONSTRATIONS OF WEB-BASED SOFTWARE APPLICATIONS

(71) Applicant: Demostack, Inc., San Francisco, CA (US)

(72) Inventors: Aaron Bar Hakim, Rishon Lezion (IL); Ofir Rabanian, Tel Aviv (IL); Ben Sterenson, Ra'anana (IL); Shahar Evron, Mattat (IL); Ivan Dimitrov, Belgrade (RS); Gonen Tiberg, Tel Aviv (IL); Gilad Avidan, Tel Aviv (IL); Yehonatan Ernest Friedman, San Francisco, CA (US); Kyle Charles Ness, Tel Aviv (IL); Daniel Elero, Novi Sad (RS); Itamar Goldberger, Tel Aviv (IL); Avraham Levi, Tel Aviv (IL)

(73) Assignee: Demostack, Inc., San Francisco, CA (US)

( * ) Notice: Subject to any disclaimer, the term of this patent is extended or adjusted under 35 U.S.C. 154(b) by 0 days.

(21) Appl. No.: 17/959,319

(22) Filed: Oct. 4, 2022

(65) Prior Publication Data
US 2023/0114651 A1     Apr. 13, 2023

Related U.S. Application Data

(60) Provisional application No. 63/253,137, filed on Oct. 7, 2021.

(51) Int. Cl.
*G06F 16/00* (2019.01)
*G06F 16/953* (2019.01)
(Continued)

(52) U.S. Cl.
CPC .......... *G06F 16/957* (2019.01); *G06F 16/953* (2019.01); *G06F 16/9566* (2019.01)

(58) Field of Classification Search
CPC .. G06F 16/957; G06F 16/953; G06F 16/9566; G06F 16/954
See application file for complete search history.

(56) References Cited

U.S. PATENT DOCUMENTS

| 5,548,724 A | 8/1996 | Akizawa et al. |
| 6,587,844 B1 | 7/2003 | Mohri |

(Continued)

FOREIGN PATENT DOCUMENTS

| CN | 103595824 A | 10/2013 |
| CN | 103685138 A | 3/2014 |

(Continued)

OTHER PUBLICATIONS

U.S. Appl. No. 17/949,263 Office Action dated May 17, 2023.
(Continued)

*Primary Examiner* — Paul Kim
(74) *Attorney, Agent, or Firm* — Meitar Patents Ltd.; Daniel Kligler

(57) ABSTRACT

A method, including capturing, at a first time from an executing web-based application including browser-executable code, a first request including a first Uniform Resource Locator (URL) for a specified resource hosted by a first server, and conveying the request to the first server. Upon receiving, from the first server, the requested resource in response to the conveyed request, the received resource is stored to a second server referenced by a second URL different from the first URL. While executing the application at a second time subsequent to the first time, a second request for the specified resource is detected in the code. While the application is executing at the second time, the code is modified so as to reference the second URL, and the modified code is executed so as to convey the second request to the second URL.

17 Claims, 12 Drawing Sheets

(51) Int. Cl.
*G06F 16/955* (2019.01)
*G06F 16/957* (2019.01)

(56) References Cited

U.S. PATENT DOCUMENTS

| | | | |
|---|---|---|---|
| 6,608,634 | B1 | 8/2003 | Sherrard et al. |
| 7,139,978 | B2 | 11/2006 | Rojewski et al. |
| 8,108,490 | B2 | 1/2012 | Guo |
| 8,332,637 | B2 | 12/2012 | Relyea |
| 8,433,733 | B2 | 4/2013 | Sayed et al. |
| 8,543,675 | B1 | 9/2013 | Yiu et al. |
| 9,237,204 | B1 * | 1/2016 | Martini ............... H04L 67/563 |
| 10,382,386 | B2 * | 8/2019 | Gissing ............... H04L 61/301 |
| 10,659,566 | B1 | 5/2020 | Luah et al. |
| 10,754,713 | B1 | 8/2020 | Witthawaskul et al. |
| 10,788,957 | B1 | 9/2020 | Lenzner |
| 11,570,238 | B2 | 1/2023 | Mohan et al. |
| 2004/0054715 | A1 | 3/2004 | Cesario |
| 2004/0100507 | A1 | 5/2004 | Hayner et al. |
| 2004/0221033 | A1 | 11/2004 | Davis et al. |
| 2009/0089404 | A1 | 4/2009 | Guo |
| 2010/0318507 | A1 | 12/2010 | Grant et al. |
| 2011/0246879 | A1 | 10/2011 | White et al. |
| 2012/0079374 | A1 | 3/2012 | Gaddis |
| 2012/0204102 | A1 | 8/2012 | Gwin et al. |
| 2013/0007622 | A1 | 1/2013 | Ke et al. |
| 2013/0219024 | A1 * | 8/2013 | Flack .................. G06F 16/986 709/219 |
| 2014/0141875 | A1 | 5/2014 | Faria |
| 2014/0173417 | A1 | 6/2014 | He |
| 2014/0289855 | A1 | 9/2014 | Schulman et al. |
| 2015/0205772 | A1 | 7/2015 | Leventhal |
| 2016/0173925 | A1 | 6/2016 | Gordon et al. |
| 2017/0171252 | A1 | 6/2017 | Xue et al. |
| 2017/0351484 | A1 | 12/2017 | Stuckman et al. |
| 2018/0123934 | A1 | 5/2018 | Gissing et al. |
| 2018/0205782 | A1 | 7/2018 | Wei et al. |
| 2019/0034213 | A1 | 1/2019 | Zweig et al. |
| 2019/0079787 | A1 | 3/2019 | Toksoz et al. |
| 2019/0392057 | A1 | 12/2019 | Denoue et al. |
| 2021/0203635 | A1 | 7/2021 | Shalikashvili et al. |
| 2021/0256200 | A1 | 8/2021 | Miller et al. |
| 2022/0004594 | A1 | 1/2022 | Smith et al. |

FOREIGN PATENT DOCUMENTS

| | | | |
|---|---|---|---|
| CN | 110196744 | A | 5/2019 |
| CN | 112882953 | A | 6/2021 |

OTHER PUBLICATIONS

International Application # PCT/US22/45592 Search Report dated Jan. 31, 2023.
Betapage, "Sitemod.io—Modify any website in real-time, Save your mod and Share it with the world", pp. 1-3, year 2022 https://betapage.co/product/sitemod-io.
Prestipino, "Modify Any Website in Real-Time with Sitemod.io & Chrome Developer Tools", pp. 1-3, Sep. 21, 2017 https://www.websitemagazine.com/blog/modify-any-website-in-real-time-with-sitemod-io-chrome-developer-tools.
"Sitemod.io—Fork Demo", pp. 1-1, YouTube Clip, last edited May 7, 2021 https://chrome.google.com/webstore/detail/sitemodio/efjbaneaebkanjmhengnedpllfdiocin?itemlang=te&hl=en.
Meclea, "Sitemod.io—Fork Demo", YouTube Clip, p. 1, Oct. 10, 2017 https://www.youtube.com/watch?v=COzKh56T0OM.
"Edit Any Website—No Code Required", pp. 1-6, year 2019-2022 https://goedit.me/.
Highsoft AS, "Highcharts", Software Sources Ltd., pp. 1-9, Jul. 30, 2021 https://software-sources.com/solutions/highsoft/.
Wikipedia, "Remote Desktop Protocol," pp. 1-11, last edited Sep. 21, 2021 https://web.archive.org/web/20210924044957/https://en.wikipedia.org/wiki/Remote_Desktop_Protocol.
"Microsoft Edge", p. 1, May 2015 https://www.techtarget.com/whatis/definition/Microsoft-Edge.
"Android—Login Screen," pp. 1-10, year 2022 https://www.tutorialspoint.com/android/android_login_screen.htm.
Wikipedia, "Selenium (Software)," pp. 1-6, last edited Sep. 21, 2021.
"Android Developers—WindowManager.LayoutParams—Flag_Secure," pp. 1-91, last updated Jul. 14, 2021 https://web.archive.org/web/20211005002148/https://developer.android.com/reference/android/view/WindowManager.LayoutParams.
"React Tutorial From Scratch: A Step-by-Step Guide," Ibaslogic.com, pp. 1-27, year 2021 https://software-sources.com/solutions/highsoft/.
"AngularJS—Superheroic Java Script MNW Framework," Google, pp. 1-4, years 2010-2021 https://angularjs.org/.
"PagerDuty," PagerDuty, Inc., Google Play, pp. 1-3, Jun. 11, 2021 https://web.archive.org/web/20210624164153/https://play.google.com/store/apps/details?id=com.pagerduty.android.
"Mitmproxy is a Free and Open Source Interactive HTTPS Proxy," Mitmproxy Project, pp. 1-4, Sep. 26, 2021 https://mitmproxy.org/.
"Apktool—A Tool for Reverse Engineering Android apk Files," pp. 1-3, Sep. 16, 2021 https://web.archive.org/web/20210916012637/https://ibotpeaches.github.io/Apktool/.
"APK Downloder," Evozi, pp. 1-2, year 2020 https://apps.evozi.com/apk-downloader/.
"Android Developers," pp. 1-6, last updated Jul. 22, 2020 https://web.archive.org/web/20210812034151/https://developer.android.com/guide/topics/manifest/provider-element.
Hardt, Ed., "The OAuth 2.0 Authorization Framework," Request for Comments 6749, pp. 1-76, Oct. 2012.
"Square/okhttp," GitHub, Inc., pp. 1-5, Sep. 28, 2021 https://github.com/square/okhttp.
"Square/retrofit," Square, Inc., pp. 1-2, year 2013 https://github.com/square/retrofit.
"Android Developers—Network Security Configuration," pp. 1-12, Sep. 26, 2021 https://developer.android.com/training/articles/security-config.
"Mitmproxy docs—About Certificates," pp. 1-5, Sep. 22, 2021 https://web.archive.org/web/20210922085629/https://docs.mitmproxy.org/stable/concepts-certificates/.
"AppAuth-Android," GitHub, Inc., pp. 1-5, Sep. 12, 2021 https://web.archive.org/web/20210912131650/https://openid.github.io/AppAuth-Android/.
Tiberg et al, U.S. Appl. No. 17/746,981, filed May 18, 2022.
Bar Hakim et al., U.S. Appl. No. 17/949,263, filed Sep. 21, 2022.
U.S. Appl. No. 17/746,981 Office Action dated Aug. 11, 2023.
International Application # PCT/US2023/066801 Search Report Sep. 19, 2023.
International Application # PCT/US2023/065981 Search Report Aug. 4, 2023.

* cited by examiner

DYNAMIC RECORDER FOR DEMONSTRATIONS OF WEB-BASED SOFTWARE APPLICATIONS

CROSS-REFERENCE TO RELATED APPLICATIONS

This application claims the benefit of U.S. Provisional Patent Application 63/253,137, filed Oct. 7, 2021, which is incorporated herein by reference.

FIELD OF THE INVENTION

The present invention relates generally to demonstration software, and specifically to recording, modifying, and presenting (i.e., executing) a recorded demonstration of a web-based software application.

BACKGROUND OF THE INVENTION

A product demo is typically used to present a software application such as a business-to-business software as a service application. The product demo can be used to show the value of a software application to a current or prospective customer, and typically involves a demonstration of the application's core features and capabilities.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method, including capturing, at a first time from an executing web-based application including browser-executable code, a first request including a first Uniform Resource Locator (URL) for a specified resource hosted by a first server, conveying the request to the first server, receiving, from the first server, the requested resource in response to the conveyed request, storing the received resource to a second server referenced by a second URL different from the first URL, detecting, while executing the web-based application at a second time subsequent to the first time, a second request for the specified resource in the browser-executable code, modifying, by a processor while the web-based application is executing at the second time, the browser-executable code so as to reference the second URL, and executing the modified browser-executable code so as to convey the second request to the second URL.

In one embodiment, the browser-executable code includes HyperText Markup Language code.

In another embodiment, the browser-executable code includes JavaScript code.

In an additional embodiment, the browser-executable code includes Cascading Style Sheet code.

In a further embodiment, the web-based application includes a set of web pages, and wherein the specific resource includes a given web page including additional browser-executable code.

In a supplemental embodiment, the specified resource includes an application programming interface for the web-based application.

In one embodiment, the specified resource includes a third-party application programming interface for a third-party service.

In another embodiment, the specified resource includes one or more records in a database table.

In an additional embodiment, the web-based application includes a web page including the browser-executable code and additional web page elements, and the method further includes modifying a given web page element in response to applying a defined rule while executing the browser-executable code, generating a rendering of the web page including the modified web page element, and presenting the rendering on a display.

In some embodiments, the given web page element includes a first text string, and wherein modifying the given web page element includes replacing the first text string with a second text string.

In other embodiments, the given web page element includes a first format, and wherein modifying the given web page element includes applying a second format to the given web page element.

In additional embodiments, the given web page element includes a first media entity, and wherein modifying the given web page element includes replacing the first media entity with a second media entity.

In further embodiments, the given web page element includes a first icon, and wherein modifying the given web page element includes replacing the first icon with a second icon.

In supplemental embodiments, the given web page element includes a first query response, and wherein modifying the given web page element includes replacing the first query response with a second query response.

In other embodiments, the web-based application includes a plurality of web pages including the given web page element, and wherein modifying the given web page element includes modifying the given web page element in a subset of the web pages.

There is also provided, in accordance with an embodiment of the present invention, an apparatus including a memory, and one or more processors configured to capture, at a first time from an executing web-based application including browser-executable code, a first request including a first Uniform Resource Locator (URL) for a specified resource hosted by a first server, to convey the request to the first server, to receive, from the first server, the requested resource in response to the conveyed request, to store, to the memory, the received resource to a second server referenced by a second URL different from the first URL, to detect, while executing the web-based application at a second time subsequent to the first time, a second request for the specified resource in the browser-executable code, to modify, while the web-based application is executing at the second time, the browser-executable code so as to reference the second URL, and to execute the modified browser-executable code so as to convey the second request to the second URL.

There is additionally provided, in accordance with an embodiment of the present invention, a computer software product for controlling operation of a computer, including a non-transitory computer-readable medium, in which program instructions are stored, which instructions, when read by a computer, cause the computer to capture, at a first time from an executing web-based application including browser-executable code, a first request including a first Uniform Resource Locator (URL) for a specified resource hosted by a first server, to convey the request to the first server, to receive, from the first server, the requested resource in response to the conveyed request, to store the received resource to a second server referenced by a second URL different from the first URL, to detect, while executing the web-based application at a second time subsequent to the first time, a second request for the specified resource in the browser-executable code, to modify, by a processor while the web-based application is executing at the second time, the browser-executable code so as to reference the second URL, and to execute the modified browser-executable code so as to convey the second request to the second URL.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for recording and editing a demonstration (also referred to herein simply as a demo or a demo recording) of a web-based software application. As described hereinbelow, steps for generating the demonstration include capturing, at a first time from an executing web-based application comprising browser-executable code, a first request comprising a first Uniform Resource Locator (URL) for a specified resource hosted by a first server. In some embodiments, the specified resource may comprise a web page of the web-based application that comprises browser-executable code such as HyperText Markup Language (HTML) code and/or JavaScript code.

The request is conveyed to the first server, and upon receiving, from the first server, the requested resource in response to the conveyed request, the received resource is stored to a second server referenced by a second URL different from the first URL. In embodiments described herein, while a user interacts with the web-based application, a set of request-response pairs can be stored so as to generate the demo recording.

While presenting the demo recording (e.g., to a potential client) at a second time subsequent to the first time, a second request for the specified resource is detected in the browser-executable code, and while the web-based application is executing at the second time, the browser-executable code is modified so as to reference the second URL. Finally, the modified browser-executable code is executed so as to convey the second request to the second URL.

In some embodiments, the recorded demonstration can be customized by creating rules that can be processed so as to effect changes in text and/or images that are presented to the user when playing the demonstration.

System Description

Figure 1:
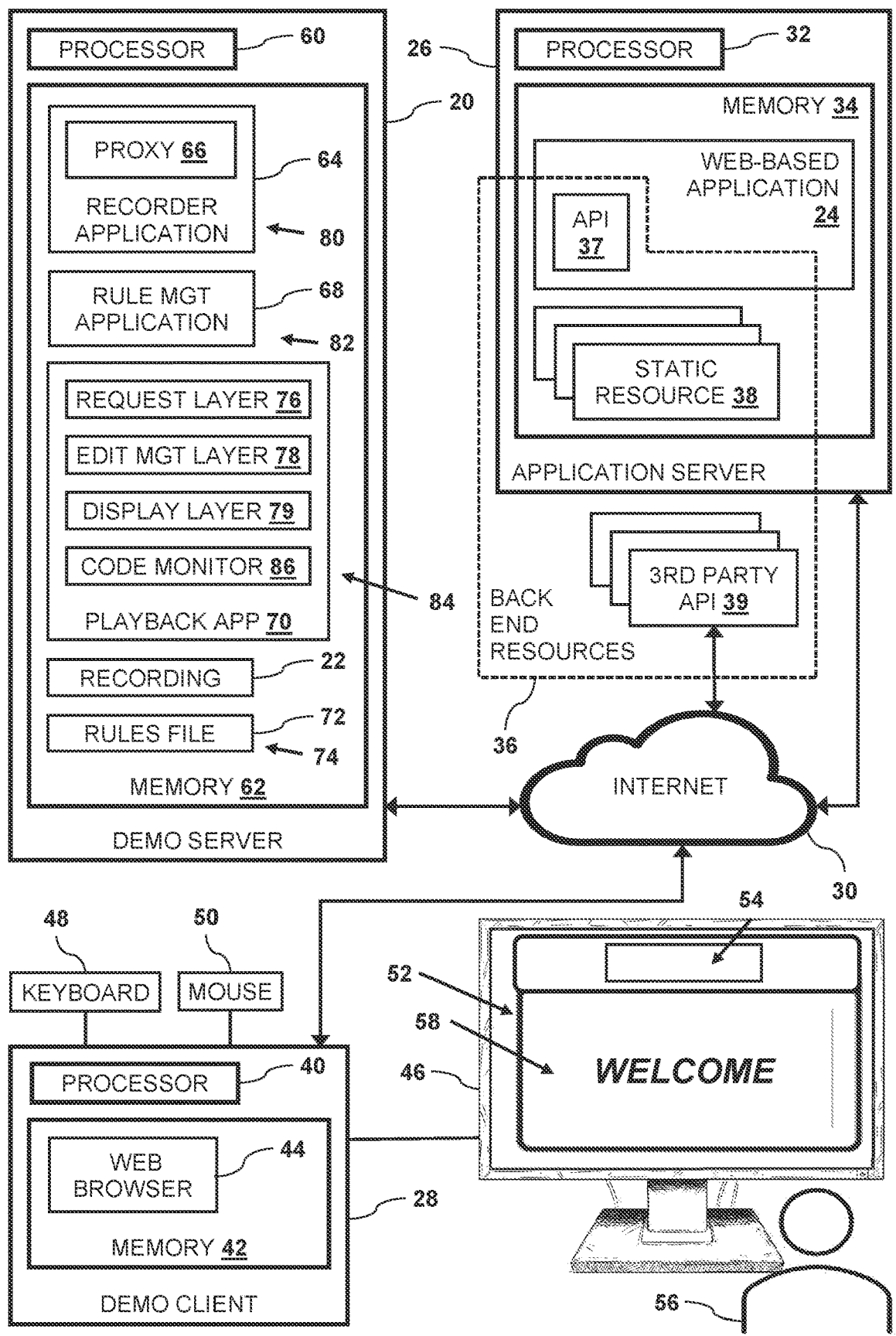
FIG. 1 is a block diagram that schematically illustrates a server computer that stores a demo recorder, a recording proxy, a rule management application, and a demo playback application that are respectively configured to create, customize, and present a demo recording of a web-based software application, in accordance with an embodiment of the present invention.

FIG. 1 is a schematic, pictorial illustration of a demo server 20 that is configured to create a demo recording 22 of a web-based software application 24 hosted by an application server 26, in accordance with an embodiment of the present invention. In the configuration shown in FIG. 1, demo server 20 can communicate with application server 26 and a demo client computer 28 over a public network 30 such as the Internet.

Application server 26 may comprise an application processor 32 and an application memory 34 that stores web-based application 24. In some embodiments, processor 32 executes web-based application 24 from memory 34.

During execution, web-based application 24 typically accesses a set of back-end resources 36 (also referred to herein as web resources 36 or simply as resources). In the configuration shown in FIG. 1, back-end resources 36 comprise:

An application programming interface (API) 37 for web-based application 24. Web-based application 24 typically comprises API 37 that enables the web pages (described in the description referencing FIG. 2 hereinbelow) of the web-page application to interact with internal components and/or external resources.

Static resources 38. Examples of static resources 38 include, but are not limited to, HyperText Markup Language (HTML) code, Cascading Style Sheet (CSS) code and JavaScript code, that processor 32 can store in memory 34. These and other components and resources used web-based application 24 are described in the description referencing FIG. 3 hereinbelow.

Third-party APIs 39. Third-party APIs 39 are hosted by servers (not shown) coupled to Internet 30, and enable web-based application 24 to access third-party resources such as GOOGLE MAPS™ (produced by ALPHABET INC., Mountain View, CA, USA).

Client computer 28 may comprise a client processor 40 and a client memory 42 that stores a web browser 44. In embodiments described herein, web browser 44 may comprise any commercially available web browser such as EDGE™ (produced by MICROSOFT CORPORATION, Redmond WA, USA). In some embodiments processor 40 can execute web browser 44 to access websites on Internet 30 or to access web-based application 24 on application server 26. In the configuration shown in FIG. 1, client computer 28 may also comprise a display 46 and physical input devices such as a keyboard 48 and a mouse 50.

In operation, browser 44, can render, on display 46, a browser frame 52 comprising a browser address bar 54. Using keyboard 48 and mouse 50, upon a user 56 entering a Uniform Resource Locator (URL) into address bar 54, browser 44 can access a web page (e.g., in web-based application 24) indicated by the URL and present a rendering 58 of the web page in browser frame 52. In the example shown in FIG. 1, rendering 58 comprises a home page for browser 44.

Demo server 20 may comprise a server processor 60 and a server memory 62. In addition to storing demo recording 22, memory 62 can also store a recorder application 64 comprising a recording proxy 66, a rule management application 68, a playback application 70 and a rules file 72.

Recorder application 64 comprising recording proxy 66 can be used to create recording 22, as described in the description referencing FIGS. 4-8 hereinbelow.

Rule management application 68 is configured to enable user 56 to define one or more rules 74 that the rule management application can store to rules file 72. Rules management application 68 and rules 74 are described in the description referencing FIGS. 9 and 10 hereinbelow.

In the configuration shown in FIG. 1, playback application 70 comprises a request layer 76, an edit management layer 78, a display layer 79, and a code monitor layer 86. As described hereinbelow, playback application 70 uses request layer 76, edit management layer 78, display layer 79, and code monitor layer 86 to present (i.e., "play back") demo recording 22.

In some embodiments, recorder application 64 can be referenced by a URL 80, rule management application 68 can be referenced by a URL 82 and playback application 70 can be referenced by a URL 84. To execute any of these applications on web browser 44, user 56 can enter the respective URL into address bar 54.

Processors 32, 40 and 60 comprise general-purpose central processing units (CPU) or special-purpose embedded processors, which are programmed in software or firmware to carry out the functions described herein. This software may be downloaded to demo server 20, application server 26 and client computer 28 in electronic form, over a network, for example. Additionally or alternatively, the software may be stored on tangible, non-transitory computer-readable media, such as optical, magnetic, or electronic memory media. Further additionally or alternatively, at least some of the functions of processors 32, 40 and 60 may be carried out by hard-wired or programmable digital logic circuits.

Examples of memories 34, 42 and 62 include dynamic random-access memories and non-volatile random-access memories. Additionally or alternatively, the memories may comprise non-volatile storage devices such as hard disk drives and solid-state disk drives.

In some embodiments, the functionality of some or all of demo server 20, application server 26 and client computer 28 may be deployed in a data cloud and/or as virtual machines in one or more physical computer systems. In one embodiment, the respective functionalities of demo server 20 and application server 26 may each be distributed over multiple physical and/or virtual computers.

Figure 2:
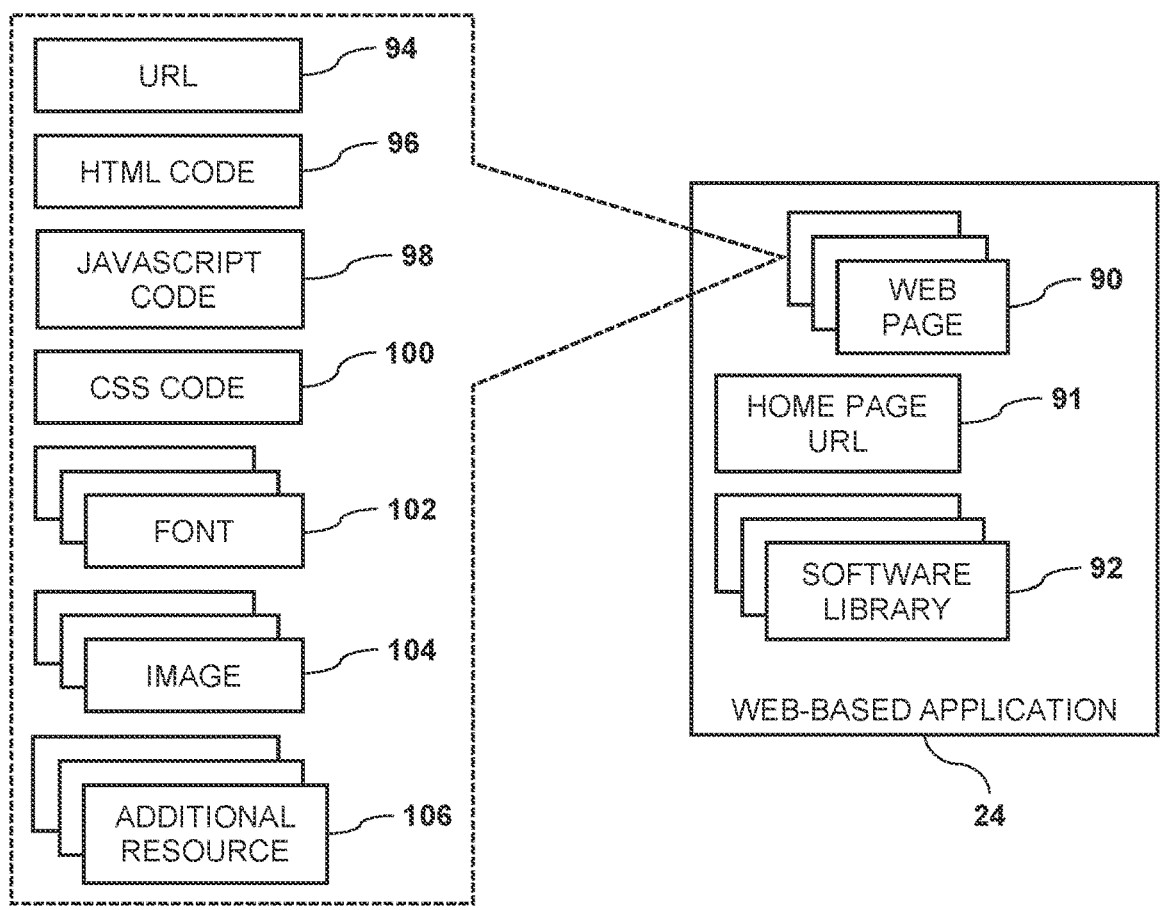
FIG. 2 is a block diagram that schematically illustrates software and data components of the web-based application, in accordance with an embodiment of the present invention.

FIG. 2 is a block diagram that schematically illustrates software and data components of web-based application 24, in accordance with an embodiment of the present invention. In some embodiments, web-based application 24 comprises or more web pages 90, a home page URL 91 and one or more software libraries 92. Home page URL 91 comprises a web address for a given web page 90 that is a home page for web-based application 24. Examples of software libraries 92 include, but are not limited to, JavaScript libraries/frameworks such as REACT, ANGULAR and VUE.

In the configuration shown in FIG. 2, each web page 90 may comprise a URL 94, HTML code 96, JavaScript code 98, CSS code 100, one or more fonts 102, one or more images 104 and one or more additional resources 106. Examples of additional resources 94 include, but are not limited to, icons, and media files such as audio, image, and video files.

Figure 4:
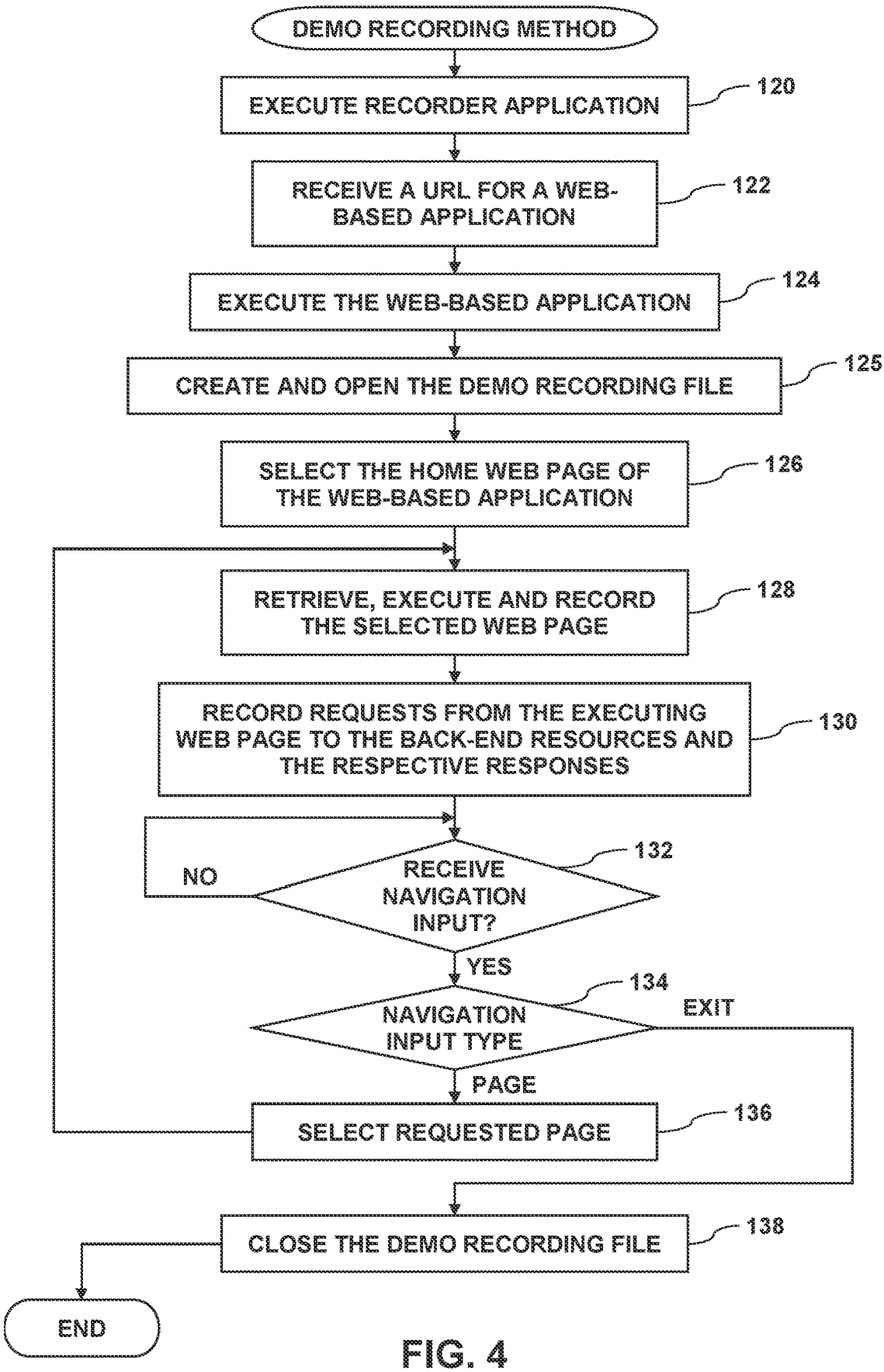
FIG. 4 is a flow diagram that schematically illustrates a method of generating a demo recording of the web-based application, in accordance with an embodiment of the present invention.

FIG. 4 is a block diagram that schematically illustrates software and data components of back-end resources 36, in accordance with an embodiment of the present invention. As described supra, back-end resources 36 may comprise one or more static resources 38, one or more application APIs 37 (i.e., for web-based application 24) and one or more third-party APIs 114.

Figure 3:
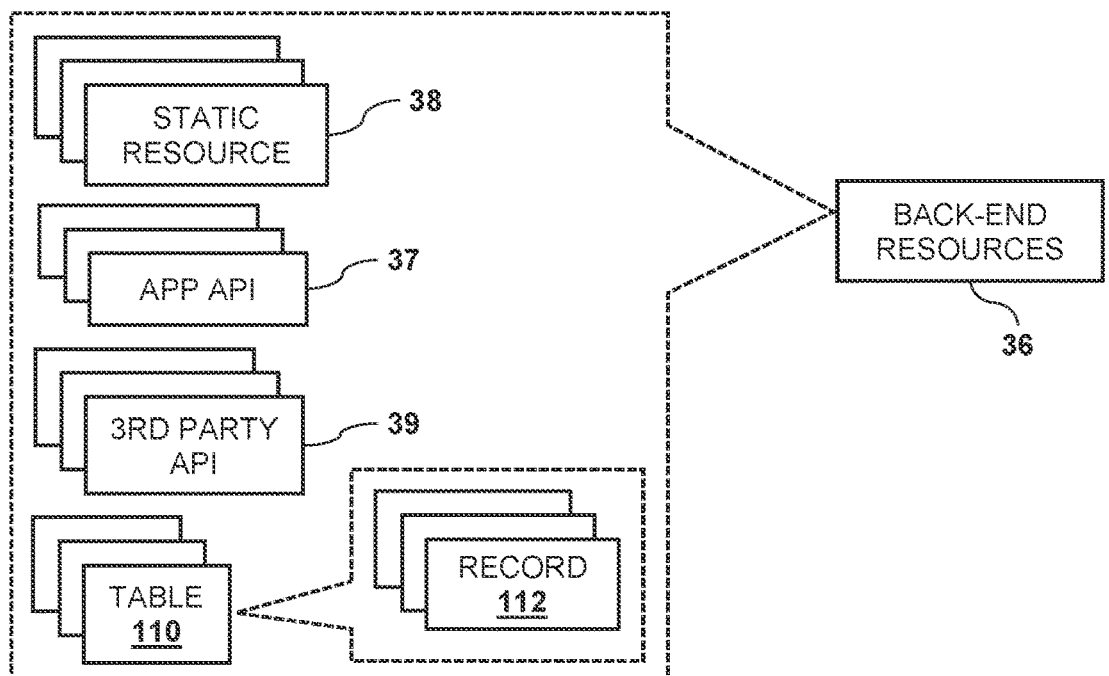
FIG. 3 is a block diagram that schematically illustrates components of back-end resources used by the web-based application, in accordance with an embodiment of the present invention.

In the configuration shown in FIG. 3, back-end resources also comprise one or more tables 110 (e.g., database tables) that each respectively comprise one or more records 112. In some embodiments, when executing a given web page 90, processor 40 can access tables 110 via API 37.

Demo Creation

Figure 5:
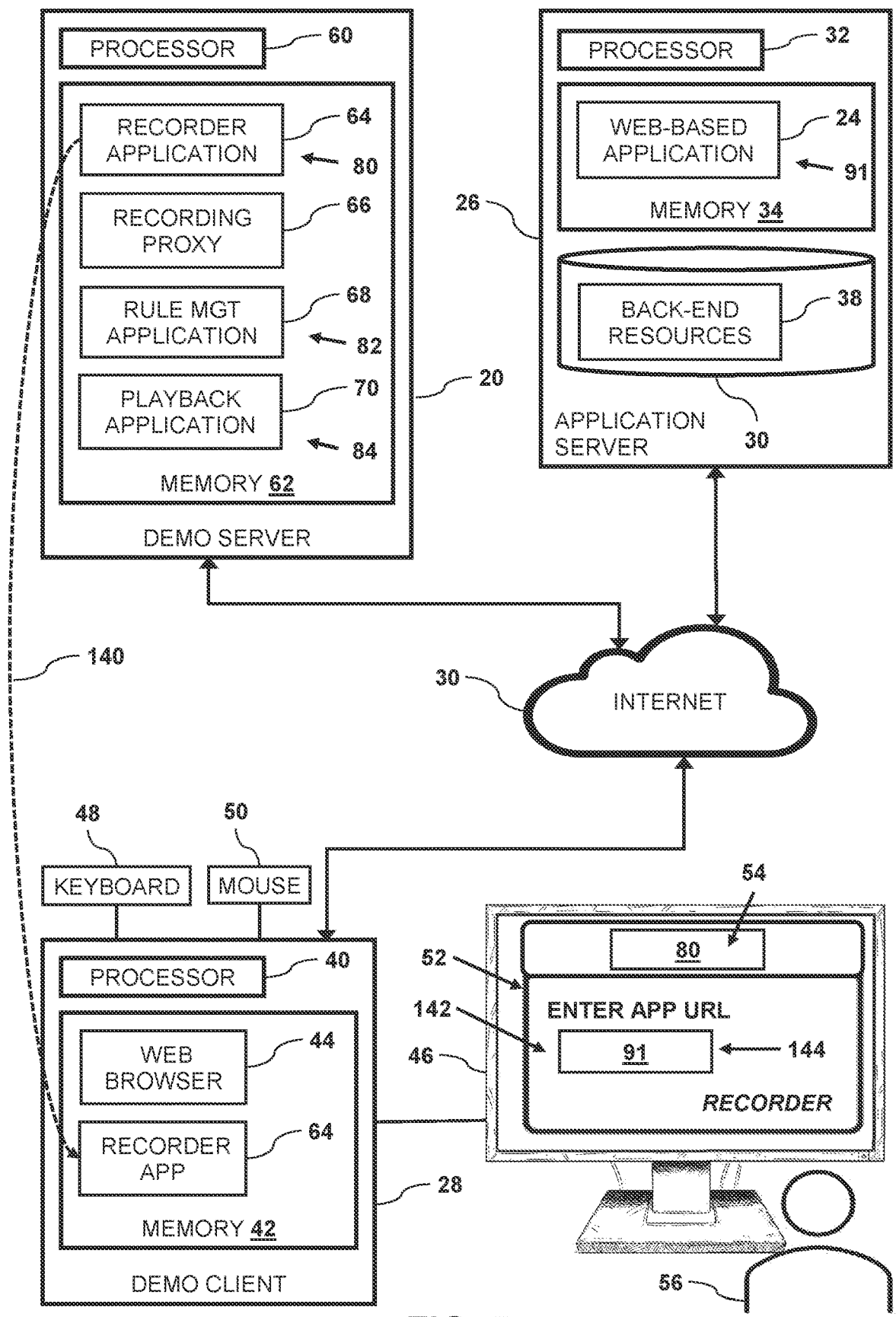
FIG. 5 is a block diagram that schematically illustrates a client computer initiating execution of the demo recorder application, in accordance with an embodiment of the present invention.
Figure 6:
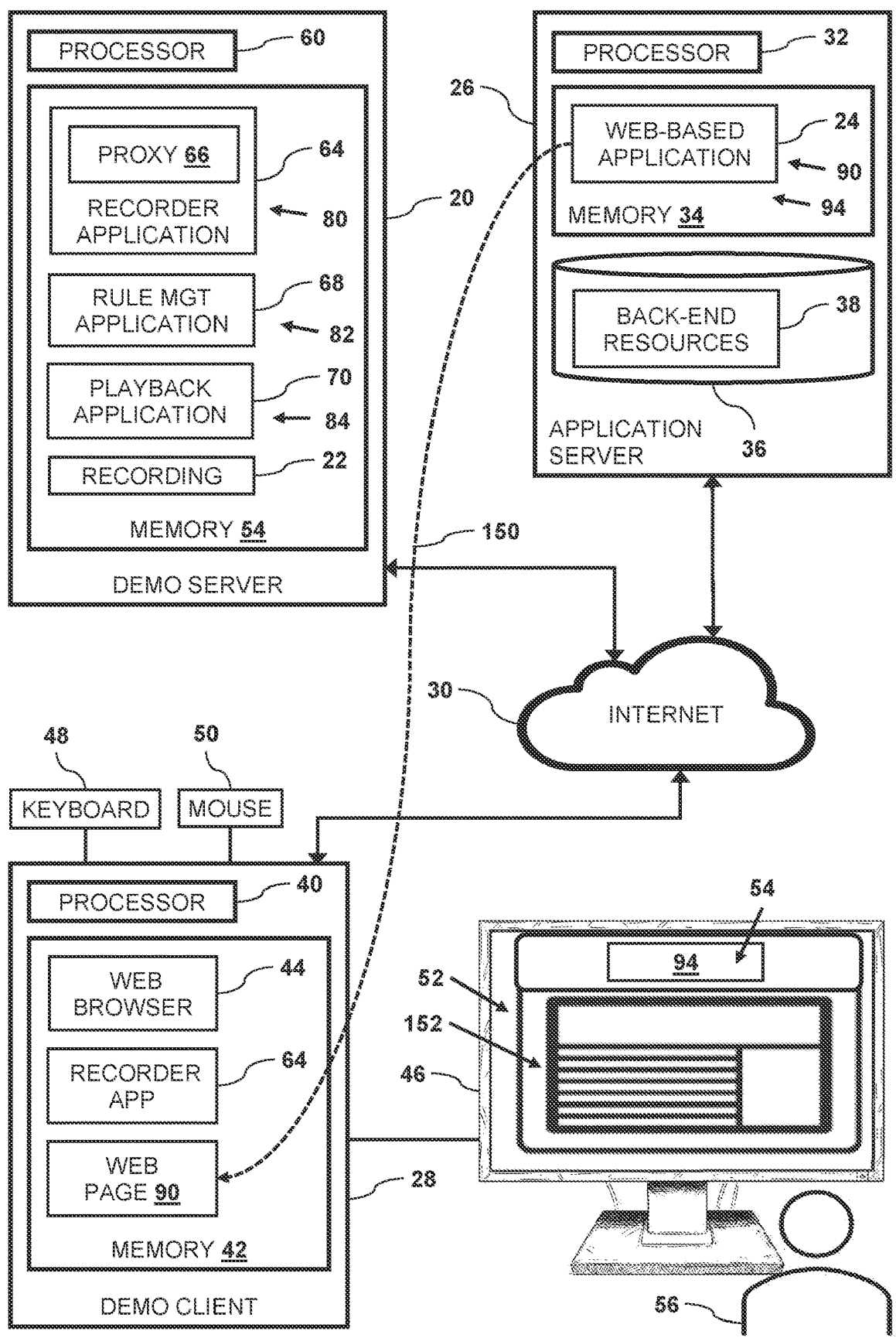
FIG. 6 is a block diagram that schematically illustrates the recorder application generating a demo recording for the web-based application, in accordance with an embodiment of the present invention.

FIG. 5 is a flow diagram that schematically illustrates a method of creating demo recording 22, and FIG. 6 is a block diagram that shows browser 44 initiating execution of recorder application, in accordance with an embodiment of the present invention.

In step 120, browser 44 executes recorder application 64. To load and start executing recorder application 64, user 56 enters URL 80 into address bar 54, which instructs browser 44 to download recorder application 64 from demo server 20, as indicated by an arrow 140. Once downloaded, browser 44 starts executing recorder application 64, which can present, in browser frame 52, an application page 142 comprising an input field 144.

In step 122, recorder application 64 receives a URL for an application, and in step 124, the recorder application initiates execution of the application. In the example shown in FIG. 5, the received URL comprises URL 80 and the application comprises web-based application 24.

FIG. 6 is a block diagram showing browser 44 executing web-based application 24, in accordance with an embodiment of the present invention. When browser 44 retrieves (as indicated by an arrow 150) and executes (i.e., browser-executable code in) a given web page 90 of web-based application 24, the browser presents, in browser frame 52 a rendering 152 of the given web page.

During execution, web-based application 24 typically conveys requests to back-end resources 36, and the back-end resources conveys responses to the web-based application in response to the requests.

In step 125, recorder application 64 creates demo recording 22 (i.e., a file) on demo server 20, and in step 126, browser 44 selects the home page (i.e., start page) of web application 24. As described supra, web-based application 24 typically comprises multiple web pages 90 having respective URLs 94. When browser 44 starts executing web-based application 24, the browser typically loads and executes a given web page 90 whose respective URL 94 matches home page URL 91.

In step 128, browser 44 retrieves the selected web page from web-based application 24 on application server 26, executes and records the selected web page. When executing the selected web page, browser 44 can present rendering 152 of the selected web page in browser frame 52. To record the selected web page, recorder application 64 can save a copy of the selected web page to demo recording 22, as described in the description referencing FIG. 7 hereinbelow.

In step 130, upon recorder application 64 detecting any requests from the selected web pages to back-end resources 36 and detecting respective responses from the back-end resources, the recorder application records (i.e., stores) the request(s) and the response(s) to demo recording 22. In some embodiments, upon recording proxy 66 receiving a given request, the recording proxy forwards the given request to back-end resources 36 and stores the request to demo recording 22. Likewise, upon recording proxy 66 receiving, from back-end resources 36, a response to the given request, the recording proxy forwards the response to the web-based application executing in browser 44 and stores the response to demo recording 22.

As described supra, back-end resources may comprise application APIs 37, static resources 39 and third-party APIs 41. Therefore, recorder application 64 can store the following requests and responses to demo recording 22:

- A given request to API 37 or API 41 and its corresponding response. For example, a call to API 37 may request retrieving a given record 112, and the response comprises data stored in the requested record. Likewise, a call to API 41 may comprise a request to GOOGLE MAPS™ to retrieve a map of a given town, and the response comprises the requested map.
- A given request to access a given static resource (e.g., a CSS file) and the requested resource.

Figure 7:
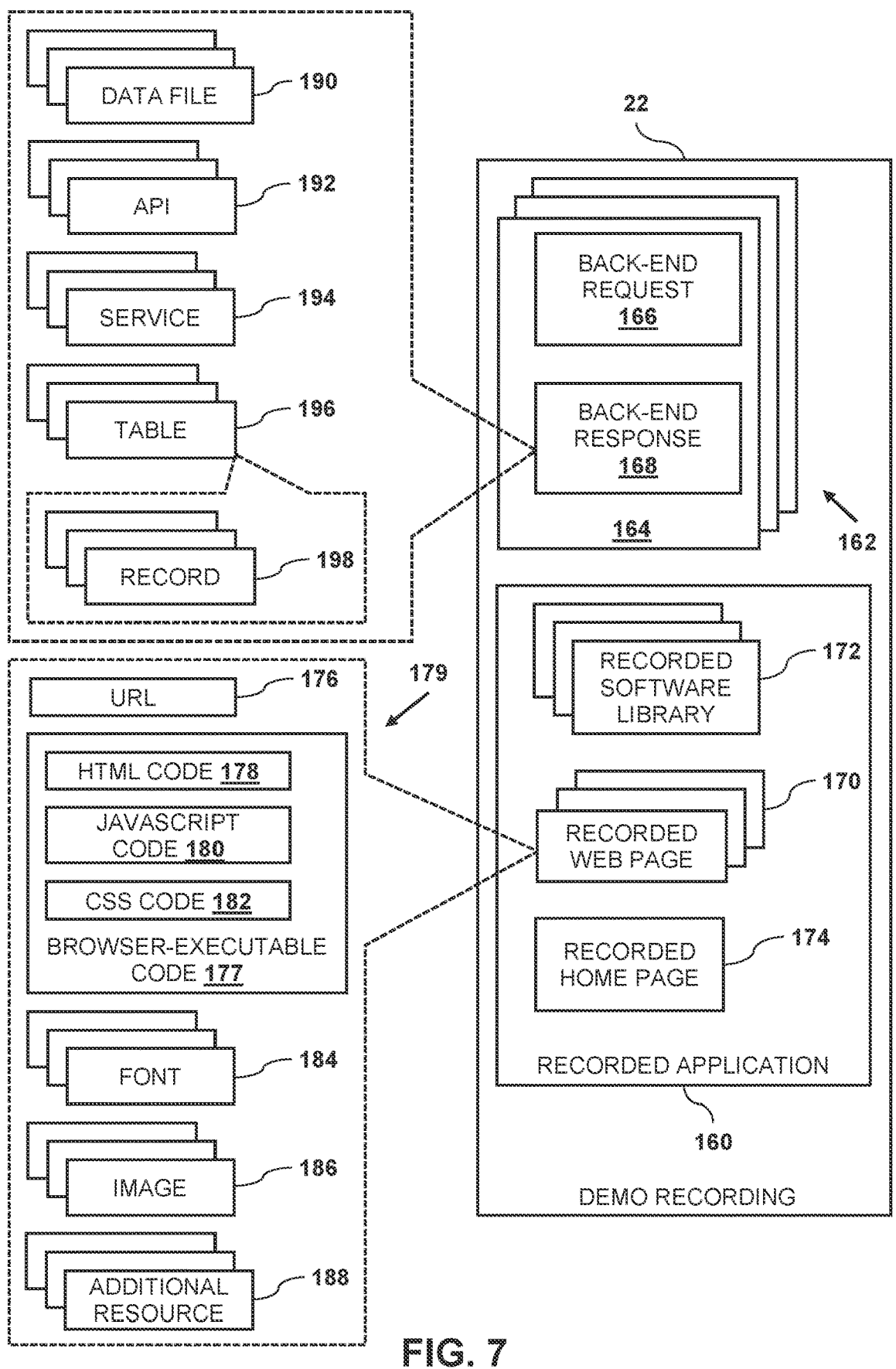
FIG. 7 is a block diagram that schematically illustrates components of the demo recording, in accordance with an embodiment of the present invention.

FIG. 7 is a block diagram of software and data components of demo recording 22, in accordance with an embodiment of the present invention. In some embodiments, demo recording 22 comprises a recorded application 160 and a request dictionary 162. As described hereinbelow, recorded application 160 comprises a copy of web-based application 24.

In the configuration shown in FIG. 7, request dictionary 162 comprises a set of tuple pairs 164, each of the tuple pairs comprising a back-end request 166 back-end response 168. Upon, while generating demo recoding 22, recorder application 64 detecting a request conveyed from web-based application 24 to back-end resources 36, the recorder application can create a new tuple pair 164, store the detected request to back-end request 166 in the new tuple pair. Likewise, upon recorder application 64 detecting, from back-end resources 36, a response to the conveyed request, the recorder application can store a copy of response to backend response in the new tuple pair.

In some embodiments, recorded application 160 comprises one or more recorded web pages 170, one or more recorded software libraries 172, and a recorded home page URL 174. Recorded software libraries 172 and home page URL 174 may comprise respective copies of software libraries 92 and home page URL 91 from web-based application 24 (i.e., the application for which demo recording 22 is being created). Each recorded web page 170 comprises a copy of a corresponding web page 90 that browser 44 loads and executes while generating demo recording 22, and can store information such as:

Recorded URL 176 comprising a copy of URL 94 in the corresponding web page.
Browser-executable code 177 that may comprise:
Recorded HTML code 178 comprising a copy of HTML code 96 in the corresponding web page.
Recorded JavaScript code 180 comprising a copy of JavaScript code 98 in the corresponding web page.
Recorded CSS code 182 comprising a copy of CSS code 100 in the corresponding web page.
Recorded fonts 184 comprising a copy of fonts 102 in the corresponding web page.
Recorded images 186 comprising a copy of images 104 in the corresponding web page.
Recorded additional resources 188 comprising a copy of additional resources 106 in the corresponding web page.

In some embodiments, browser-executable code 177, fonts 184, images 186 and resources 188 may be collectively referred to herein as web page elements 179.

In additional embodiments, recorded back-end response 168 comprises information such as:

Recorded data files 190 comprising copies of any data files 110 web-based application 24 accessed while generating demo recording 22.
Recorded APIs 192 comprising copies of any APIs 112 web-based application 24 accessed while generating demo recording 22.
Recorded third-party services 194 comprising copies of any third-party services 114 web-based application 24 accessed while generating demo recording 22.
Recorded tables 196 and recorded records 198 comprising copies of records 118 in tables 114 that web-based application 24 accessed while generating demo recording 22.

In step 132, browser 44 waits to receive a navigation input from user 56. Upon receiving the navigation input, the browser determines a navigation input type in step 134. In embodiments described herein, the navigation input types may a request to navigate to a different web page 90 (e.g., in response to user 56 clicking on a link on the given web page), or a request to exit the web-based application.

If the received navigation input type is to navigate to a different web page 90, then in step 136, browser 44 selects the different web page, and the method continues with step 128.

However, if the navigation input type is to exit web-based application, then in step 138 recorder application 64 stops recording responses from back-end resources 36, closes demo recording 22, and the method ends.

Figure 8:
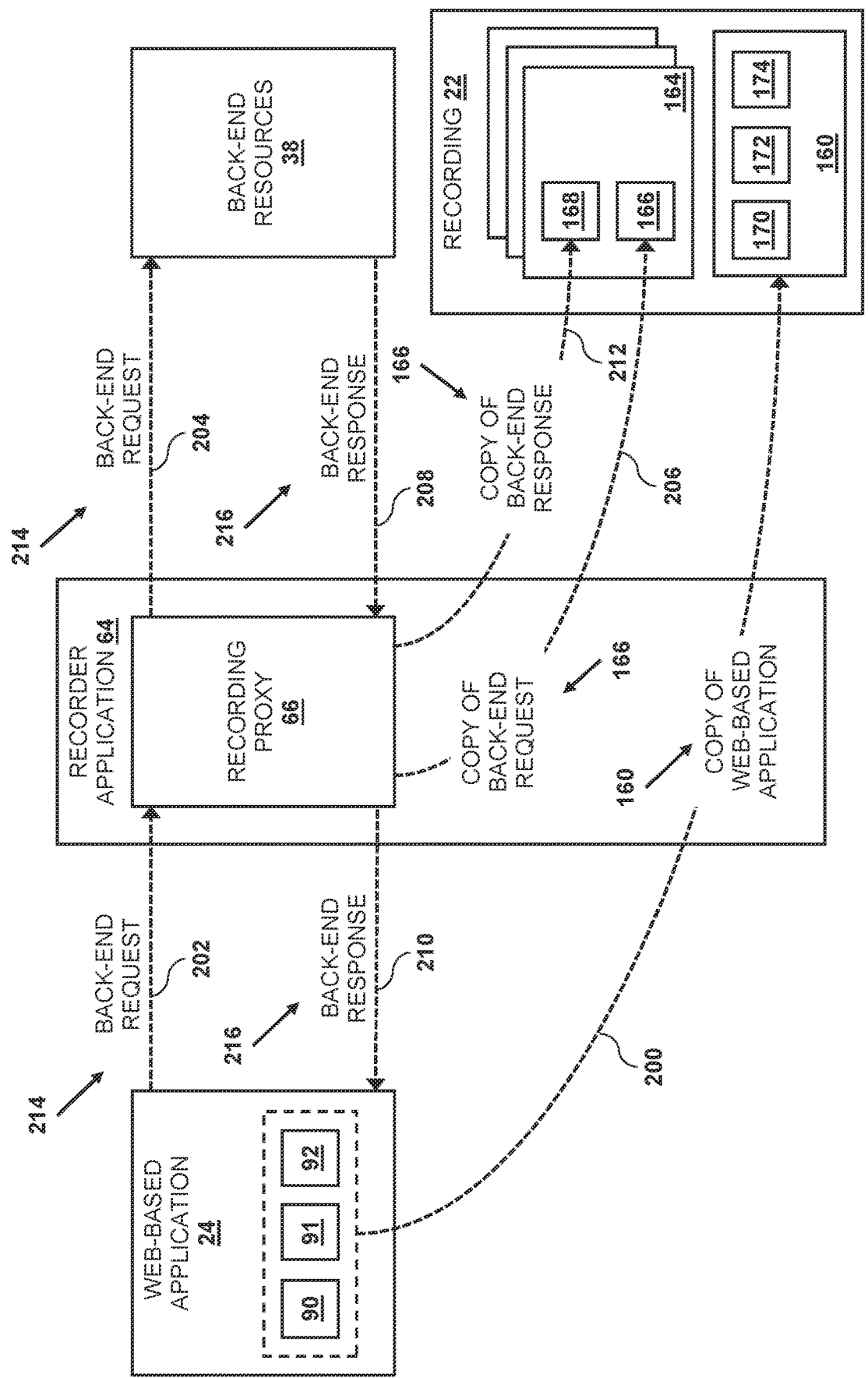
FIG. 8 is a block diagram that schematically illustrates data flowing through the demo recorder and the demo proxy applications when generating the demo recording, in accordance with an embodiment of the present invention.

FIG. 8 is a block diagram that schematically illustrates data flowing through demo recorder application 64 when generating the demo recording 22, in accordance with an embodiment of the present invention. The data flow as presented in FIG. 8 can be summarized in the following steps:

- Recorder application 64 stores, to demo recording 22, recorded application 160 that comprises a copy of web-based application 24, as indicated by an arrow 200.
- Web-based application 24 generates and conveys a back-end request 214 to back-end resources 36, as indicated by an arrow 202.
- Recording proxy 66 intercepts the conveyed back-end request, and forwards the conveyed back-end request to back-end resources 36, as indicated by an arrow 204
- Recording proxy 66) stores a copy 166 of the conveyed back-end request to demo recording 22, as indicated by an arrow 206.
- Back-end resources generates and conveys, to web-based application 24, a back-end response 216 in response to the conveyed back-end request, as indicated by an arrow 208.
- Recording proxy 66 intercepts the conveyed back-end response, and forwards the conveyed back-end request to web-based application 24, as indicated by an arrow 210.
- Recording proxy 66 stores a copy 166 of the conveyed back-end response to demo recording 22, as indicated by an arrow 212.

Demo Customization

Software applications such as web-based based application 24 are typically demonstrated to multiple potential clients. As explained hereinbelow, embodiments of the present invention enable user 56 to define rules 74 that edit management layer 76 and display layer 79 (i.e., in playback application 70) can use to customize the playback of demo recording 22. For example, user 56 may want to change a company's name, logo or slogan when demonstrating web-based application 24 to a potential client.

Figure 9:
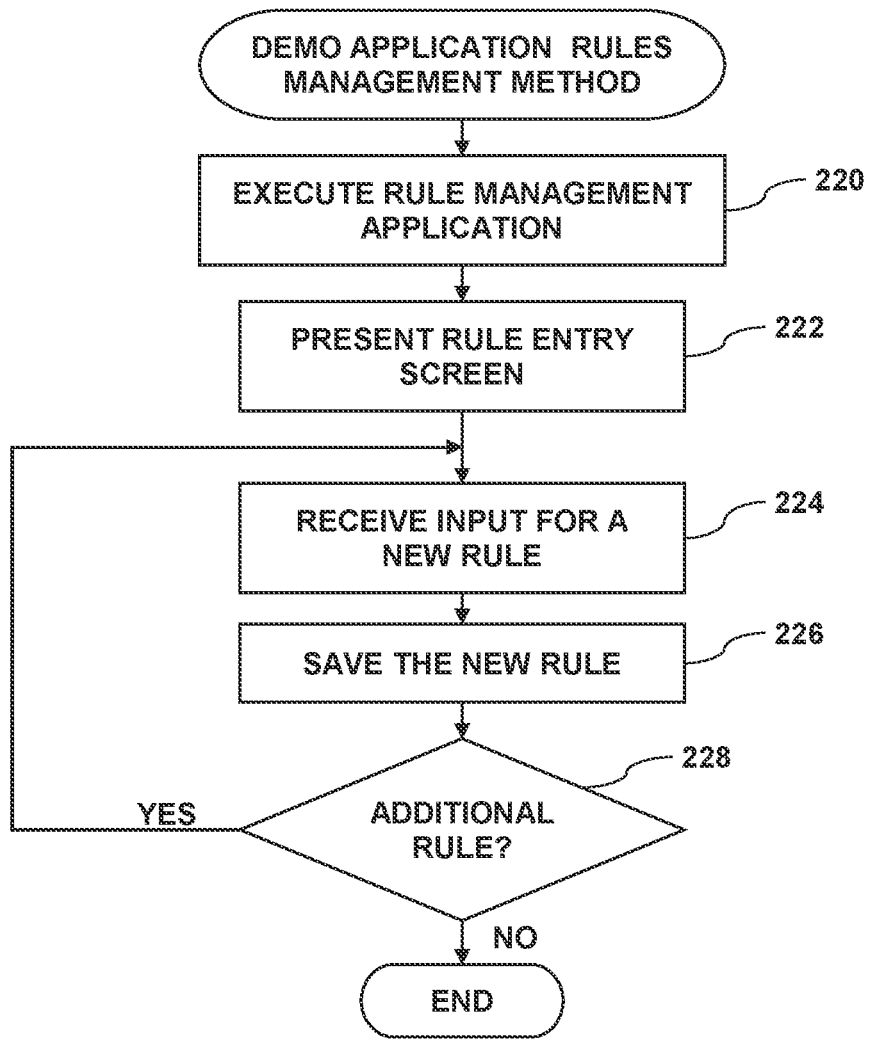
FIG. 9 is a flow diagram that schematically illustrates a method of creating rules that can be used to customize demo playback, in accordance with an embodiment of the present invention.
Figure 10:
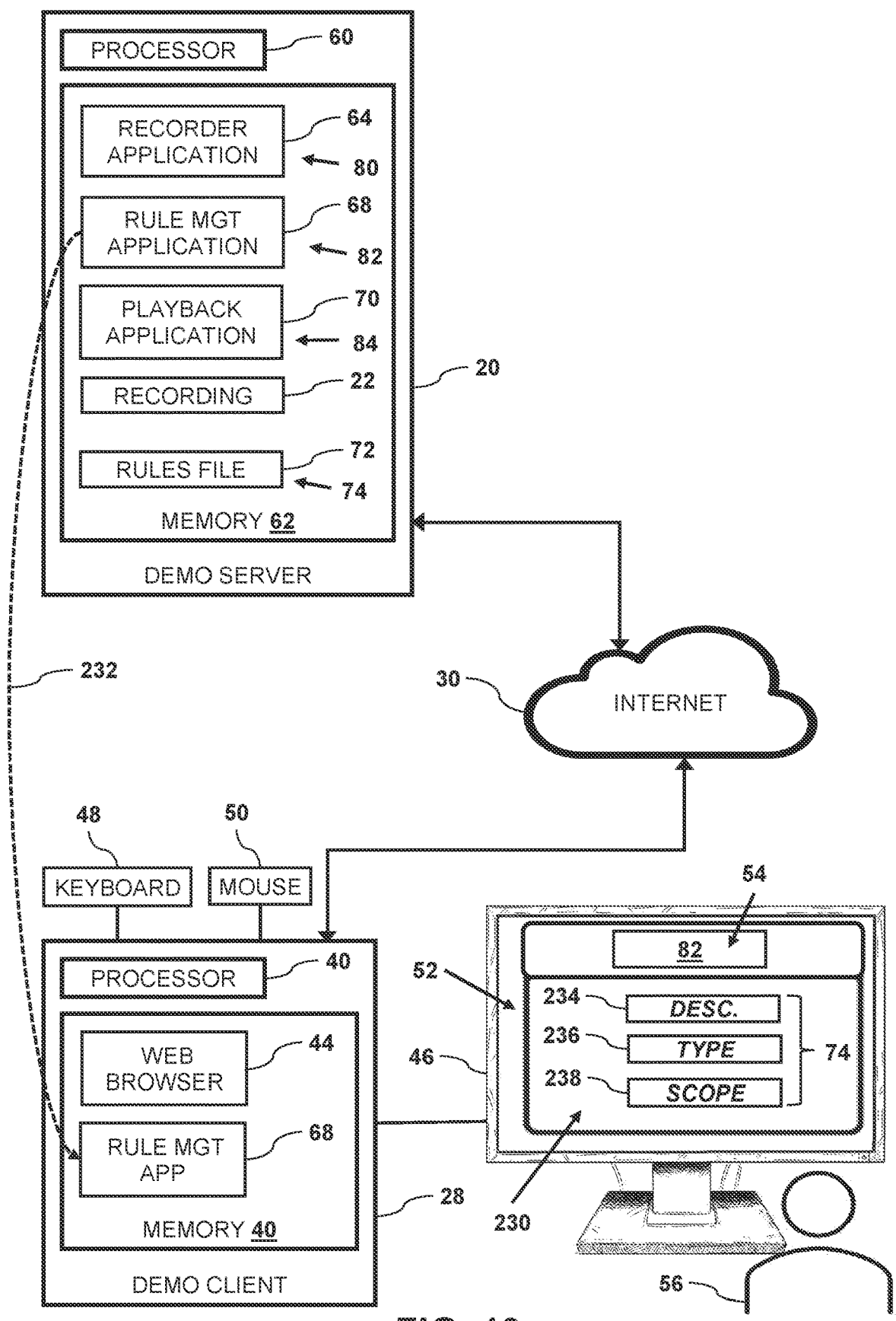
FIG. 10 is a block diagram that schematically illustrates the client computer presenting a rule entry screen while executing the rule management application, in accordance with an embodiment of the present invention.

FIG. 9 is a flow diagram that schematically illustrates a method for managing rules 74, and FIG. 10 is a block diagram showing client computer 28 presenting a rule entry screen 230 while executing rule management application 68, in accordance with an embodiment of the present invention.

In step 220, browser 44 executes rule management application 68. To load and start executing rule management application 68, user 56 enters URL 82 into address bar 54, which instructs browser 44 to download and start executing rule management application 68 from demo server 20, as indicated by an arrow 232.

In step 222, upon initiating execution, rule management application 68 presents, in browser frame 52, rule entry screen 230. In the example shown in FIG. 9, rule entry screen 230 comprises data entry fields for a single rule 74 comprising a rule description 234, a rule type 236 and a rule scope 238.

In some embodiments, rule description 234 comprises replacement instructions for HTML code in a given recorded page 170 in demo recording 22. For example, the rule description
'Provide prompt and superior service'→{{Objective}} provides text for the Objective HTML variable.

Rule type 236 indicates what type of data is to be replaced. Examples of rule types 236 include but are not limited to text replacement, media entity (e.g., image or video file) replacement, icon replacement, a formatting change (e.g., style or color of text and background), and data replacement rules (described in the description referencing FIG. 13 hereinbelow).

In embodiments herein, a given rule 74 whose respective rule type 236 comprises text replacement (i.e., replacing a first text string with a second text string), a media entity replacement (i.e., replacing a first media entity with a second text entity), a formatting change (i.e., changing the format used to present a given web page element 179 from a first format to a second format), or an icon replacement (i.e., replacing a first icon with a second icon) may also be referred to as a display rule 74. Likewise, a given rule 74 whose respective rule type 236 comprises data replacement may also be referred to as a data replacement rule 74.

Rule scope 238 indicates a scope of the rule. For example, rule scope 238 can indicate that the replacement (i.e., indicated by description 234 and type 236) is for a single recorded web page 170, a specific plurality of recorded web pages 170, or all of the recorded web pages (i.e., a subset comprising any number of the recorded web pages).

Returning to FIG. 8, in step 224, rule management application 68 receives, from user 56 input (i.e., rule description 234, rule type 236 and rule scope 238) for a new rule 74, and in step 226, the rule management application saves the new rule to rules file 72.

In step 228 if user 56 wants to create an additional rule 74, then the method continues with step 224. If user 56 is finished creating rules 74, then the method ends.

Demo Playback

In embodiments described herein, demo recording 22 comprises a self-contained "environment" comprising all software and data elements necessary for playback application 70 to present a demonstration of web-based application 24. In other words, playback application 70 can sandbox recorded application 160 when presenting demo recording 22.

As described in the description referencing FIG. 1 hereinabove, playback application 70 comprises request layer 76 and edit management layer 78. In one embodiment, when executing a given recorded web page 170 in demo recording 22, request layer 76 can redirect requests to back-end resources 36 to back-end responses 168. In this embodiment, edit management layer 78 can apply rules 74 to HTML code 178 in recorded web pages 170 so as to customize the recorded web pages when presented on display 46.

Figure 11:
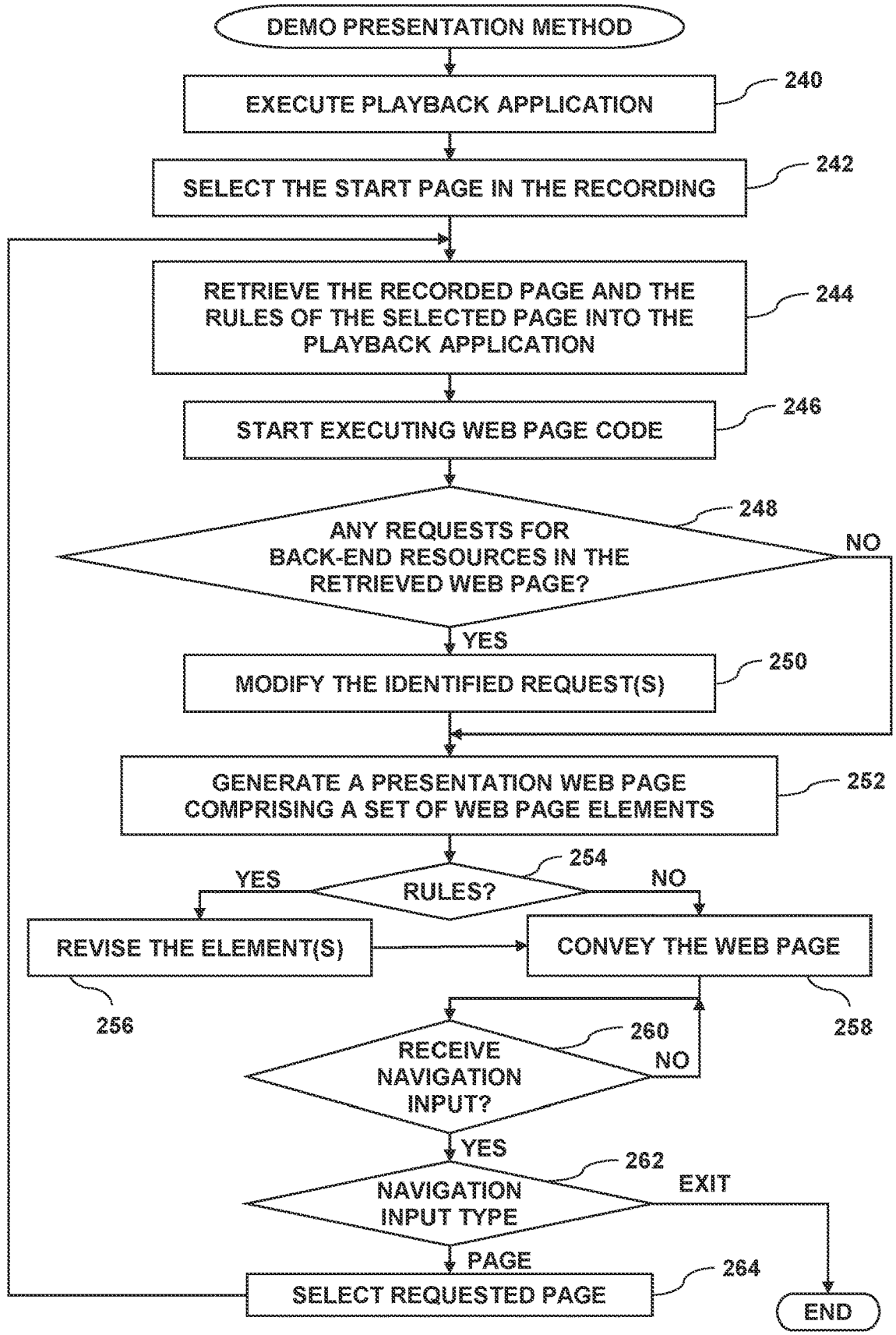
FIG. 11 is a flow diagram that schematically illustrates a method of presenting the demo recording on the client computer, in accordance with an embodiment of the present invention.
Figure 12:
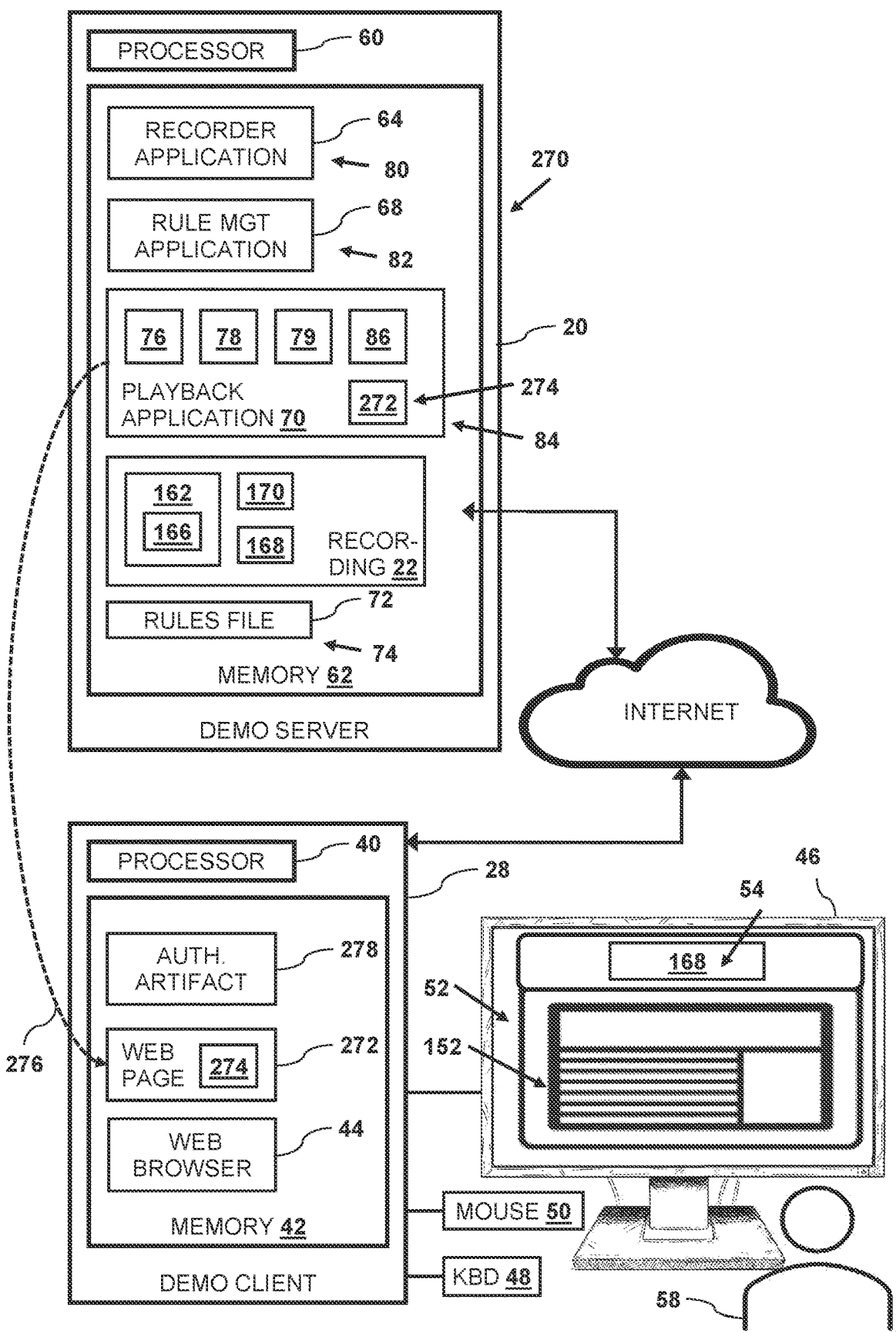
FIG. 12 is a schematic pictorial illustration showing the playback application presenting the demo recording on the client computer, in accordance with an embodiment of the present invention.

FIG. 11 is a flow diagram that schematically illustrates a method for playback application 70 to use request layer 76 and edit management layer 78 when presenting demo recording 22, and FIG. 12 is a block diagram showing client computer 28 executing the playback application, in accordance with an embodiment of the present invention. In embodiments described herein, presenting demo recording 22 comprises executing recorded application 160, and sandboxing the recorded application so that any requests to back-end resources 36 are redirected to request dictionary 162.

In the configuration shown in FIG. 12, demo recording is hosted by demo server 20 that can be referenced by a demo URL 270. In the example described hereinbelow, demo URL comprises demoserver.com.

In step 240, browser 44 loads and starts executing playback application 70. To load and start executing playback application 70, user 56 enters URL 84 into address bar 54, which instructs browser 44 start executing playback application 70 on demo server (FIG. 12).

In step 242, playback application 70 accesses recorded application 160 and selects an initial recorded web page 170. Typically, the initial recorded web page comprises a given recorded web page 170 whose URL 176 matches home URL 174.

In step 244, playback application 70 retrieves the following:
The selected recorded web page 170. Per the description referencing FIG. 7 hereinabove, retrieving selected recorded web page 170 comprises retrieving, HTML code 178, JavaScript code 180, CSS code 182, fonts(s) 184, any images 186 and any additional resources 188 used by the selected recorded web page.
Any recorded software libraries 172 used by the selected recorded web page.
Any rules 74 from rules file 72 that apply for the selected recorded web page.

In step 246, playback application 70 starts executing the browser-executable code in the retrieved recorded web page.

In step 248, while executing the browser-executable code in the retrieved web page, code monitor 86 analyzes the browser-executable code so as to determine whether or not the browser-executable code comprises any requests to back-end resources 36. In embodiments herein, analyzing the browser-executable code comprises analyzing any of HTML code 178, JavaScript code 180 and CSS code 182 JS or CSS code 184 in the retrieved recorded web page.

In some embodiments, playback application 70 can "sandbox" recorded application 160 so that request layer 76 redirects any requests for back-end resources 36 to back-end resources 168 in request dictionary 162. Sandboxing web-based application 24 is described in the description referencing FIG. 13 hereinbelow.

In the description referencing FIG. 7 hereinabove, back-end responses 168 comprise data files 190, APIs 192, third-party resources 194 and tables 196 comprising records 198, all of which may also collectively be referred to herein as recorded resources. For example, a request for a given resource may comprise a request for a given third-party service 194 or a request for one or more records 198 in a given table 196.

If playback application 70 detects any requests to back-end resources 36 in the browser-executable code, then in step 250, the playback application modifies each given identified request so that the request references the URL of the server hosting back-end responses in recording 22.

For example, if the browser-executable code comprises the following request for an image:
abcsite.com/image1.jpg
then playback application 70 can modify the request to
abcsite.demoserver.com/image1
where demoserver.com comprises the demo URL for server 20 that hosts recording 22. Alternatively, the request can be modified to:
demoserver.com/abcsite.com/image1
In these examples, image1.jpg can be hosted by the demoserver.com cloud infrastructure (i.e., instead of the abcsite.com domain).

The selected recorded web page may comprise multiple requests for different back-end resources 36. In a first embodiment, playback application 70 may detect a match between all the requests and all the recorded resources. In a second embodiment, playback application 70 may not detect a matching recorded resource for one or more of the requests. In the second embodiment, playback application 70 can perform step 250 for any of the matched requests and generate an error message for the non-matched requests (or modify each given non-matched requests so that they request a given recorded resource).

In step 252, display layer 79 generates a presentation web page 272 for presentation by demo client 28. Presentation web page 272 comprises a set of web page elements 274. Web page elements 274 are analogous to web page elements 179, and may comprise HTML code, CSS code, images etc.

In step 254, edit management layer 76 analyzes initial web page 272 to determine whether or not any rules 74 are applicable to web page elements 274. If one or more rules 74 are applicable to web page elements 274 (e.g., a given web page element comprises a first company name, and a given rule 74 replaces the first company name with a second company name), then in step 256, edit management layer 76 revises, in response to applying uses one or more rules, one or more web page elements 274 in presentation web page 272.

As described supra, a given web page element 274 may be comprise custom browser-executable code that executes on browser 44 and is configured to perform real-time modifications on demo client 28 while executing web-based application 24. In a first real-time modification embodiment, the custom browser-executable code can retrieve and apply rules 74 to any web-page elements that browser-executable code in presentation web page 272 dynamically generated while executing in browser 44.

In step 258, display layer 79 conveys presentation web page 272 to demo client 28, as indicated by arrow 276. In response to receiving and processing presentation web page 272, browser 44 presents rendering 152 on display 46.

In some embodiments, a given web page element 274 may be comprise custom browser-executable code that executes on browser 44 and is configured to perform real-time modifications on demo client 28 while executing web-based application 24 using embodiments described hereinbelow. In a second real-time modification embodiment (the first real-time modification embodiment is described supra), the custom browser-executable code can be configured, in real-time, to detect and to modify (using embodiments described in the description referencing steps 248 and 250 hereinabove) any requests for back-end resources 36 that a second web-page element that in browser-executable code in presentation web page 272 dynamically generated while executing in browser 44. In a third real-time modification embodiment, the custom browser-executable code may be configured to detect and correct any authorization artifacts (e.g., cookies and session tokens) that browser 44 generated while processing and rendering web page 272.

For example, a given artifact may comprise the following cookie for a given web application 24 whose respective URL 91 is www.abc.com:
123.log.abcsite.com
In the second embodiment, the custom browser-executable code can modify the cookie as follows so as to reference demo URL 270:
123.log.demoserver.abcsite.com In step 260, browser 44 waits to receive a navigation input from user 56. Upon receiving the navigation input, the browser determines the navigation input type in step 262. In embodiments described herein, the navigation input types may a request to navigate to a different recorded web page 170, or a request to exit recorded application 160.

If the received navigation input type is to navigate to a different recorded web page 170, then in step 264, browser 44 selects the different recorded web page, and the method continues with step 244. However, if the navigation input type is to exit recorded the web-application in recording 22, then the method ends.

Returning to step 254, if there are no rules 74 applicable to the selected recorded web page, then the method continues with step 258.

Figure 13:
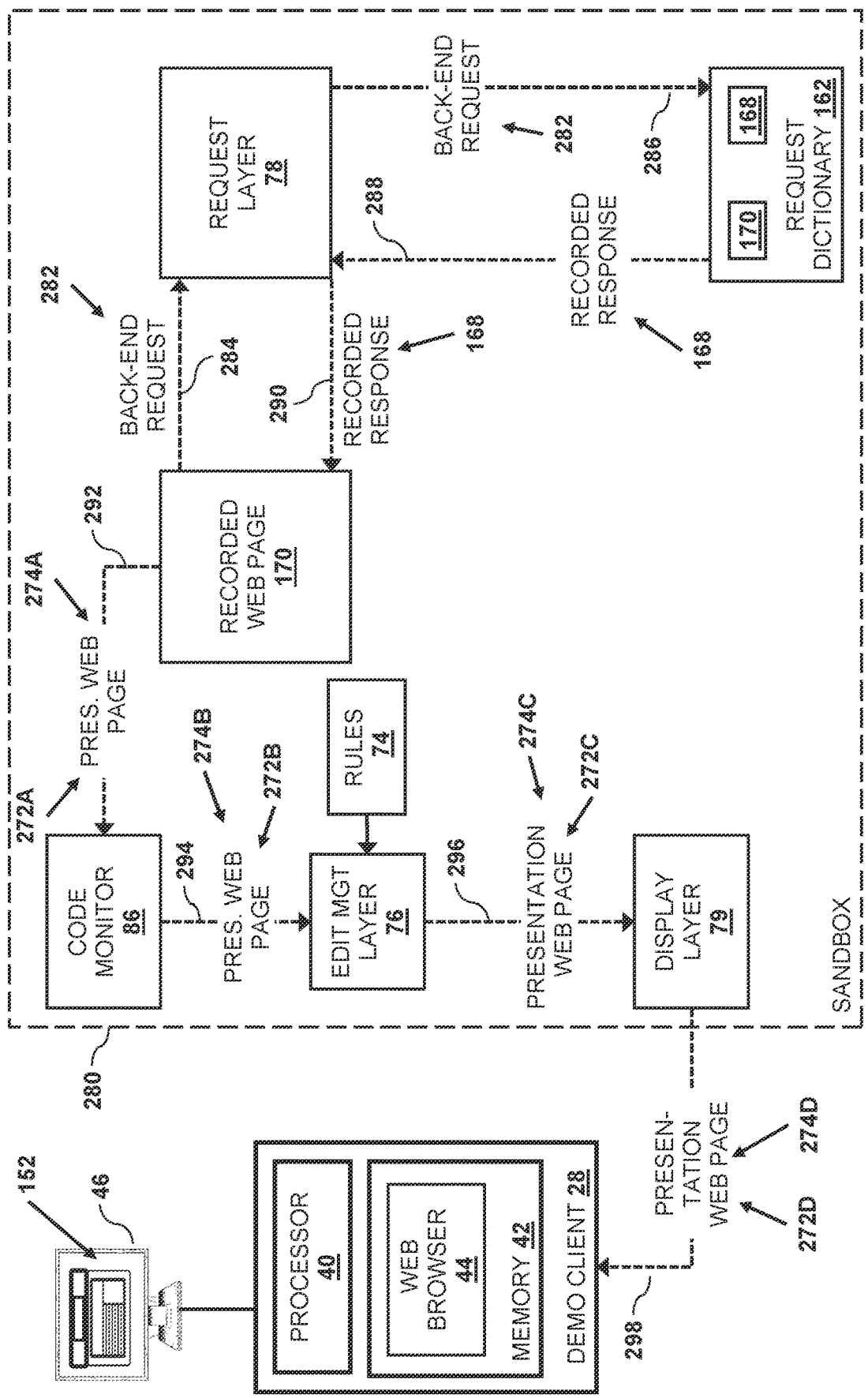
FIG. 13 is a block diagram that schematically illustrates data flowing through the demo playback application when presenting the demo recording, in accordance with an embodiment of the present invention.

FIG. 13 is a block diagram that schematically illustrates data flowing through playback application 70 when presenting demo recording 22, in accordance with an embodiment of the present invention. In some embodiments, playback application 70 can present demo recording 22 by executing recorded application 160 in a sandbox 280. In FIG. 13, presentation web page 272 and web page elements 274 can be differentiated by appending a letter to the identifying numeral, so that the presentation web pages comprise presentation web page 272A-272D, and the and web page elements comprise web page elements 274A-274D.

As described supra, sandboxing recorded application 160 enables requests generated by the recorded application to be re-routed and processed by request dictionary 162, Additionally, sandboxing recorded application 160 can enable edit management layer 78 to customize renderings 152 of recorded web pages 170.

The data flow as presented in FIG. 13 can be summarized in the following steps:

A given recorded web page 170 (i.e., executed by playback application 70) generates and conveys a demo back-end request 282 to back-end resources 36, as indicated by an arrow 284.

Request layer 76 intercepts and redirects demo back-end request 282 to request dictionary 162, as indicated by an arrow 286.

Request dictionary 162 conveys recorded response 168 (i.e., in response to demo back-end request 282) to request layer 76, as indicated by an arrow 288.

Request layer 76 forwards recorded response 168 to recorded web page 170 (i.e., of recorded application 160), as indicated by an arrow 290.

Upon receiving demo back-end requests 282, the given recorded web page 170 (i.e., executed by playback application 70) generates presentation web page 272A comprising web page elements 274A, as indicated by an arrow 292.

Using embodiments in the description referencing steps 248 and 250 described hereinabove step, code monitor 86 modifies any web page elements 274A comprising requests to back-end resources 36 so as to generate presentation web page 272B whose web page elements 274A comprise the updated requests, as indicated by an arrow 294.

Using embodiments in the description referencing steps 254 and 256 described hereinabove, edit management layer 76 applies rules 74 to presentation web page 272B so as to generate presentation web page 272C comprising updated web page elements 274C (i.e., that comprise updates based on rules 74), as indicated by an arrow 296.

Display layer 79 adds, to presentation web page 272C, the custom browser-executable code (i.e., a given web page element 274D) that as described supra, modifies resource requests and authentication artifacts 304, so as to generate presentation web page 272D. Display layer 79 conveys presentation web page 272D to demo client 28.

Web browser 44 receives and processes presentation web page 272D so as to generate rendering 274B on display 46.

As described supra, a given rule type 236 for a given rule 74 may comprise data replacement. In this case, the given data replacement rule can be processed by request layer 78. In one embodiment, the given data replacement rule may instruct request layer 78 to respond to a specific request 284 (e.g., retrieve the first record 112 in a given table 110) with specified data (i.e., in the corresponding recorded response 290).

In another embodiment, the given data replacement rule may instruct request layer 78 to change the data in a given response 168. For example, the given data replacement rule can specify that upon detecting "John Smith" in any given recorded response 2288, to replace "John Smith" with "Jane Doe" in the corresponding recorded response 290.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   storing, at a first time, a recording of browser-executable code of a web-based application while the code is executed by a first browser running the web-based application;
   capturing, while executing the code and running the web-based application at the first time, a first request comprising a first Uniform Resource Locator (URL) for a specified resource hosted by a first server;
   conveying the request to the first server;
   receiving, from the first server, the requested resource in response to the conveyed request, which causes the browser to render, responsively to execution of the code, a web page including a web page element corresponding to the resource;
   storing the received resource to a second server referenced by a second URL different from the first URL;
   running a demonstration of the web-based application by playing back the recording stored at the first time and executing the browser-executable code in the stored recording by a second browser on a client computer at a second time subsequent to the first time;
   detecting, while running the demonstration of the web-based application, a second request for the specified resource in the browser-executable code;
   directing the second request to the second URL and modifying, by a processor while running the demonstration, the browser-executable code so as to alter the web page element corresponding to the resource and thereby change one or more of text and images that are presented in the demonstration relative to the recording; and
   executing the modified browser-executable code so as to cause the second browser to render the web page during the demonstration with the altered web page element.

2. The method according to claim 1, wherein the browser-executable code comprises HyperText Markup Language code.

3. The method according to claim 1, wherein the browser-executable code comprises JavaScript code.

4. The method according to claim 1, wherein the browser-executable code comprises Cascading Style Sheet code.

5. The method according to claim 1, wherein the web-based application comprises a set of web pages, and wherein the specified resource comprises a given web page comprising additional browser-executable code.

6. The method according to claim 1, wherein the specified resource comprises an application programming interface for the web-based application.

7. The method according to claim 1, wherein the specified resource comprises a third-party application programming interface for a third-party service.

8. The method according to claim 1, wherein the specified resource comprises one or more records in a database table.

9. The method according to claim 1, wherein the web page element comprises a first text string, and wherein modifying the browser-executable code comprises replacing the first text string with a second text string.

10. The method according to claim 1, wherein the web page element comprises a first format, and wherein modifying the browser-executable code comprises applying a second format to the given web page element.

11. The method according to claim 1, wherein the web page element comprises a first media entity, and wherein modifying the browser-executable code comprises replacing the first media entity with a second media entity.

12. The method according to claim 1, wherein the web page element comprises a first icon, and wherein modifying the browser-executable code comprises replacing the first icon with a second icon.

13. The method according to claim 1, wherein the web page element comprises a first query response, and wherein modifying the browser-executable code comprises replacing the first query response with a second query response.

14. The method according to claim 1, wherein the web-based application comprises a plurality of web pages comprising the web page element, and wherein modifying the browser-executable code comprises modifying the web page element in a subset of the web pages.

15. An apparatus, comprising:
a memory; and
one or more processors configured:
to store, at a first time, a recording of browser-executable code of a web-based application while the code is executed by a first browser running the web-based application,
to capture, while executing the code and running the web-based application at the first time, a first request comprising a first Uniform Resource Locator (URL) for a specified resource hosted by a first server,
to convey the request to the first server,
to receive, from the first server, the requested resource in response to the conveyed request, which causes the browser to render, responsively to execution of the code, a web page including a web page element corresponding to the resource,
to store, to the memory, the received resource to a second server referenced by a second URL different from the first URL,
to run a demonstration of the web-based application by playing back the recording stored at the first time and executing the browser-executable code in the stored recording by a second browser on a client computer at a second time subsequent to the first time;
to detect, while running the demonstration of the web-based application, a second request for the specified resource in the browser-executable code,
to direct the second request to the second URL and modify, while running the demonstration, the browser-executable code so as to alter the web page element corresponding to the resource and thereby change one or more of text and images that are presented in the demonstration relative to the recording, and
to execute the modified browser-executable code so as to cause the second browser to render the web page during the demonstration with the altered web page element.

16. A computer software product for controlling operation of a computer, comprising a non-transitory computer-readable medium, in which program instructions are stored, which instructions, when read by a computer, cause the computer:
to store, at a first time, a recording of browser-executable code of a web-based application while the code is executed by a first browser running the web-based application;
to capture, while executing the code and running the web-based application at the first time, a first request comprising a first Uniform Resource Locator (URL) for a specified resource hosted by a first server;
to convey the request to the first server;
to receive, from the first server, the requested resource in response to the conveyed request, which causes the browser to render, responsively to execution of the code, a web page including a web page element corresponding to the resource;
to store the received resource to a second server referenced by a second URL different from the first URL;
to run a demonstration of the web-based application by playing back the recording stored at the first time and executing the browser-executable code in the stored recording by a second browser on a client computer at a second time subsequent to the first time;
to detect, while running the demonstration of the web-based application, a second request for the specified resource in the browser-executable code;
to direct the second request to the second URL and to modify, while running the demonstration, the browser-executable code so as to alter the web page element corresponding to the resource and thereby change one or more of text and images that are presented in the demonstration relative to the recording; and
to execute the modified browser-executable code so as to cause the second browser to render the web page during the demonstration with the altered web page element.

17. The method according to claim 1, wherein capturing the first request comprises capturing all requests for specified resources while executing the code at the first time, and wherein directing the second request comprises, while running the demonstration, directing all the requests to the second server.

* * * * *